C. G. SÖDERLUND.
METHOD AND MACHINE TO BEND METAL WIRE INTO LOOPS.
APPLICATION FILED JUNE 7, 1918.

1,326,541.

Patented Dec. 30, 1919.
9 SHEETS—SHEET 1.

Inventor.
C. G. Söderlund
By H. R. Kerslake
Atty.

C. G. SÖDERLUND.
METHOD AND MACHINE TO BEND METAL WIRE INTO LOOPS.
APPLICATION FILED JUNE 7, 1918.

1,326,541.

Patented Dec. 30, 1919.
9 SHEETS—SHEET 4.

Inventor.
C. G. Söderlund
By L. R. Kerslake
Atty

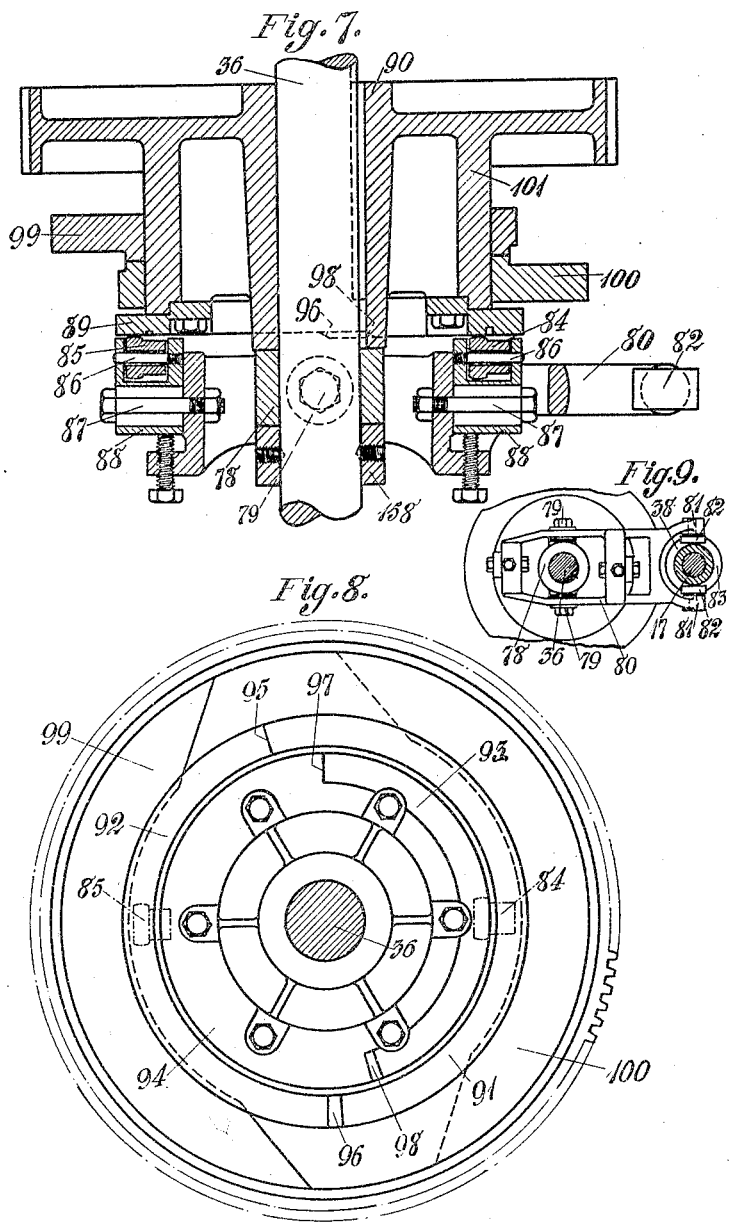

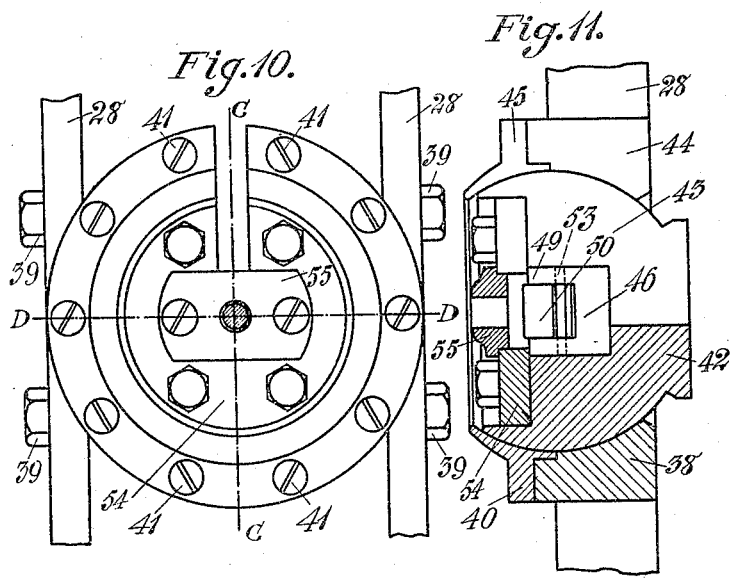
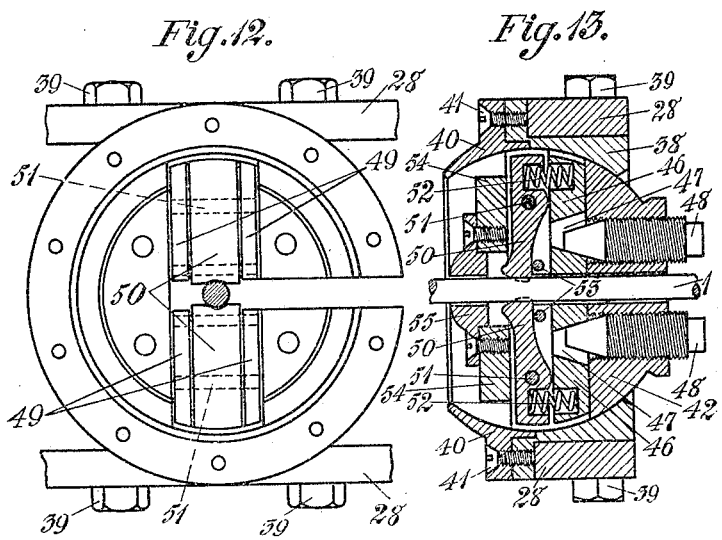

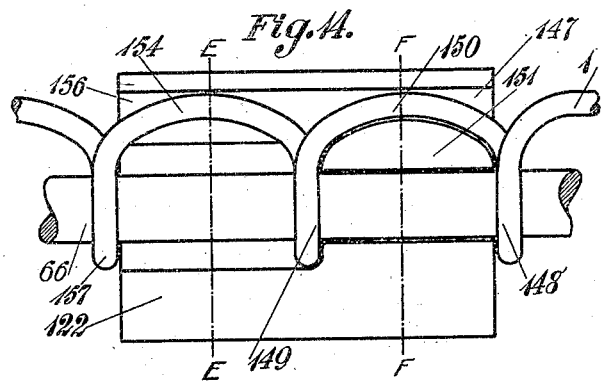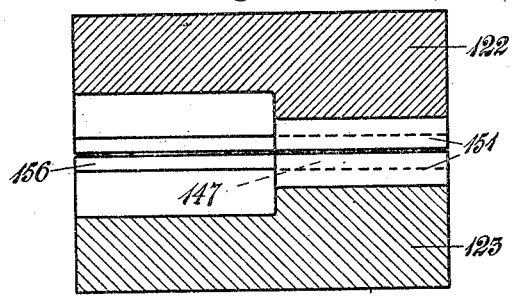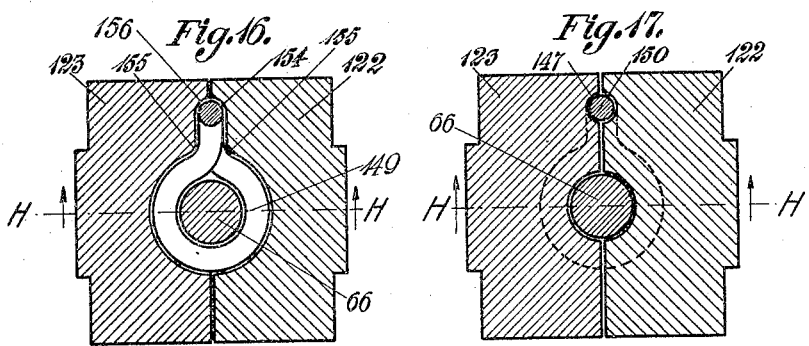

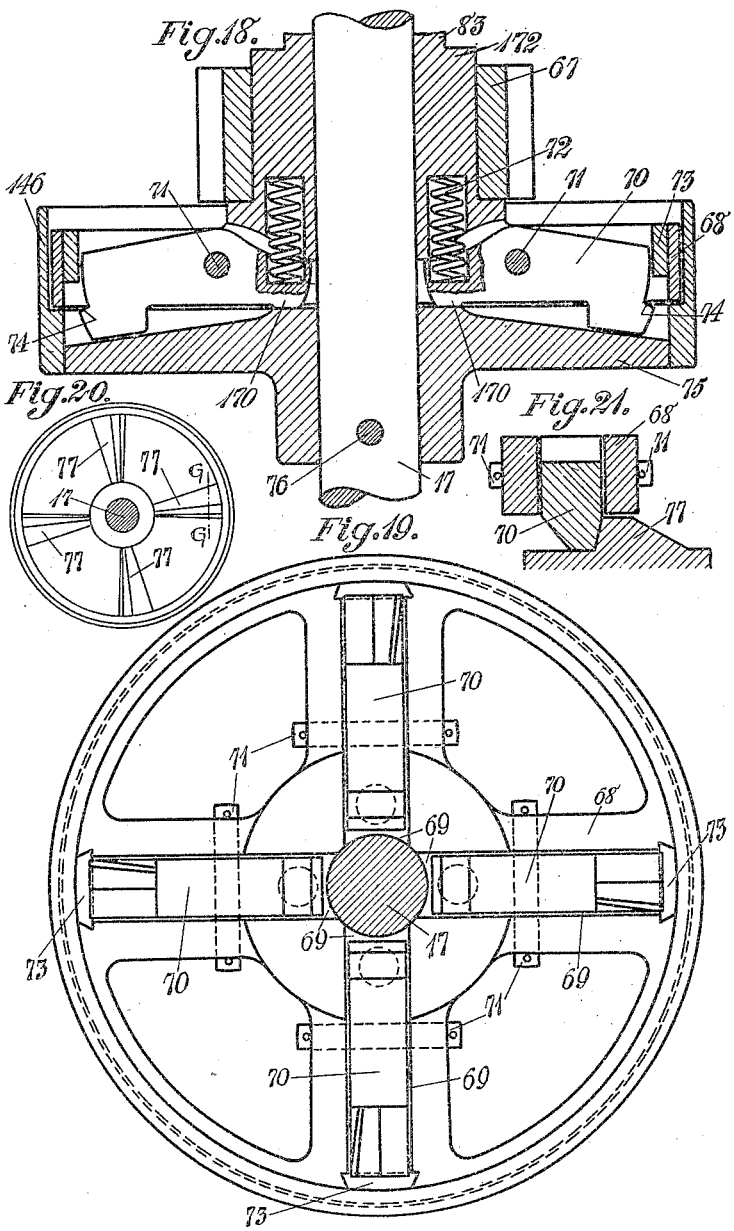

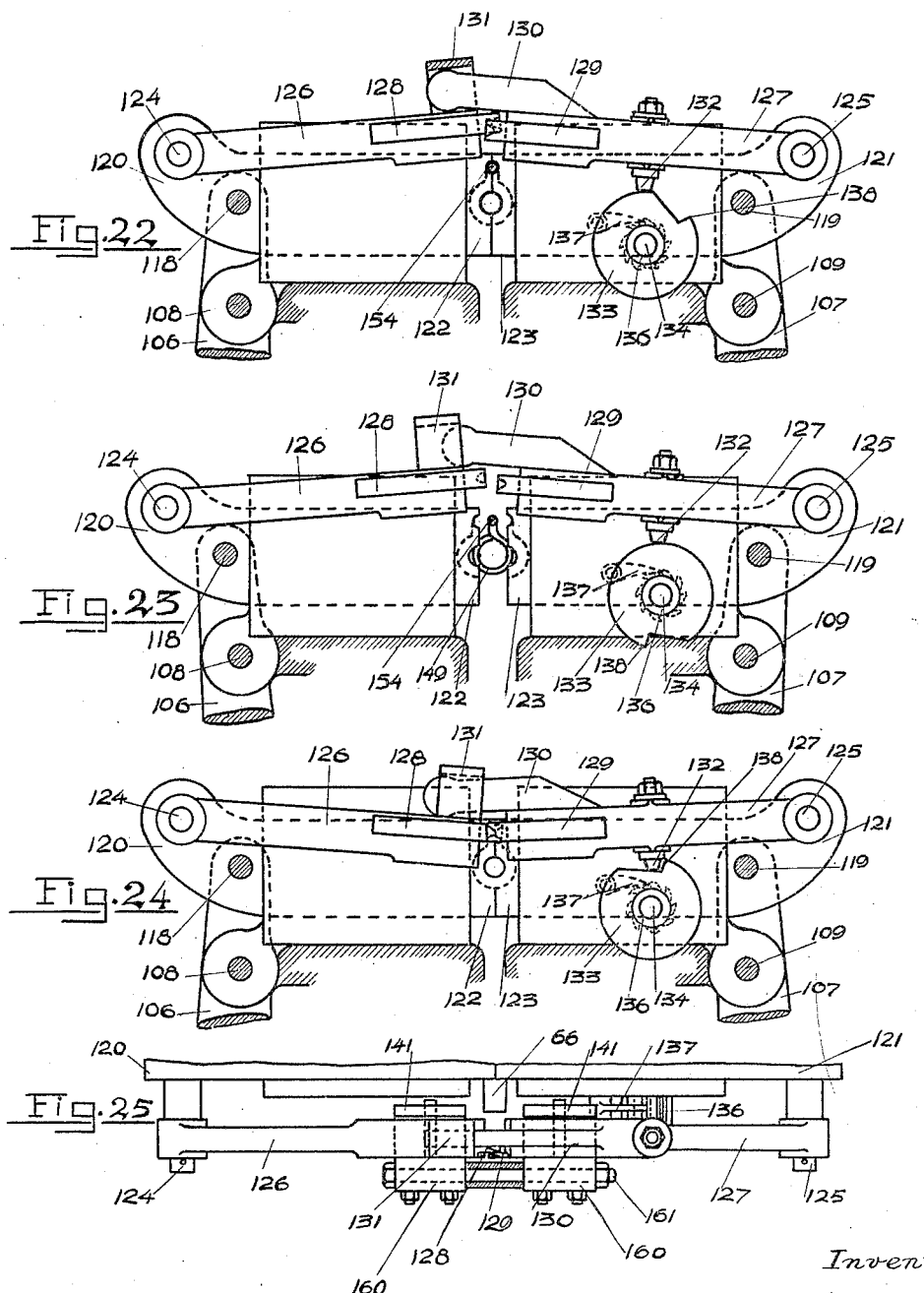

UNITED STATES PATENT OFFICE.

CARL GUSTAF SÖDERLUND, OF GOTTENBORG, SWEDEN, ASSIGNOR TO AKTIEBOLAGET LIDKÖPINGS MEKANISKA VERKSTAD, OF LIDKÖPING, SWEDEN.

METHOD AND MACHINE TO BEND METAL WIRE INTO LOOPS.

1,326,541.        Specification of Letters Patent.      Patented Dec. 30, 1919.

Application filed June 7, 1918. Serial No. 238,735.

*To all whom it may concern:*

Be it known that I, CARL GUSTAF SÖDERLUND, a subject of the King of Sweden, residing at Hisingen, Gottenborg, in the county of Gottenborg and Bohus and Kingdom of Sweden, have invented new and useful Improvements in Methods and Machines to Bend Metal Wire into Loops, of which the following is a specification.

This invention relates to an improved method of and machine for bending metal wire into a series of successively arranged spaced loops, each forming an approximate circle, lying in a plane at right angles to the main direction of the wire proper. In performing the method the wire is intermittently fed forward, and between each two feeding movements the wire is given one or more turns around a mandrel arranged eccentrical and parallel to the portion of the wire which has not been subjected to the looping action.

In the accompanying drawings—

Fig. 7 is an axial section of a coupling device forming part of the machine.

Fig. 8 is a plan view of the same device.

Fig. 9 is a detail thereof shown on a decreased scale.

Figure 1:
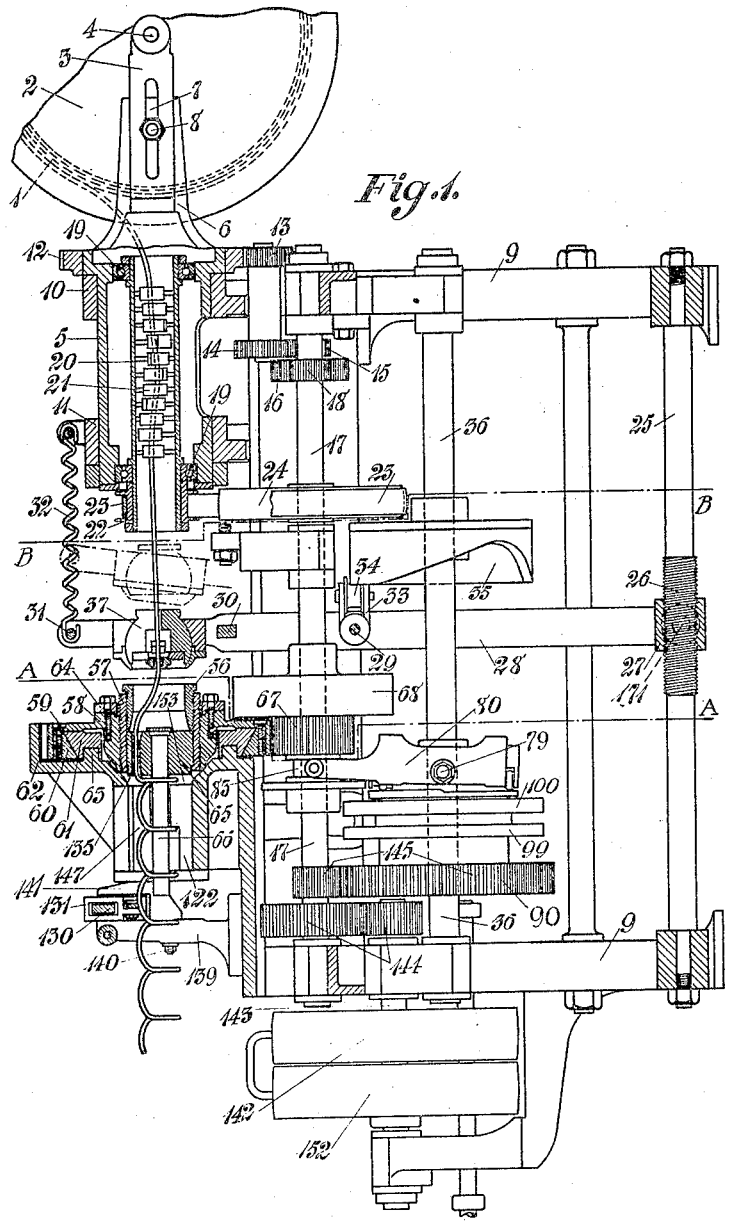
Figure 1 is a vertical longitudinal section of the machine.
Figure 2:
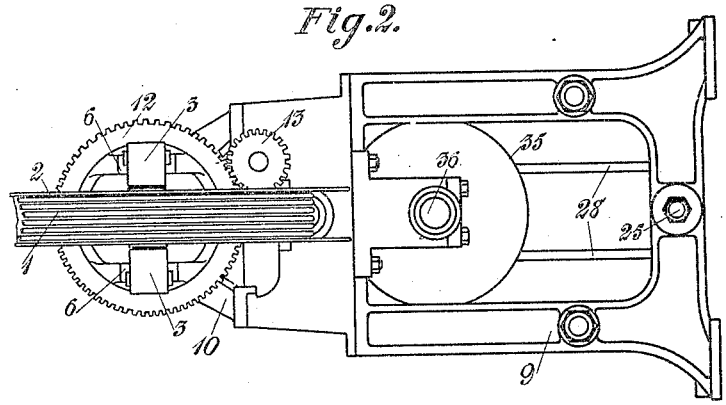
Figs. 2 and 3 are respectively right and left end views of the machine.
Figure 3:
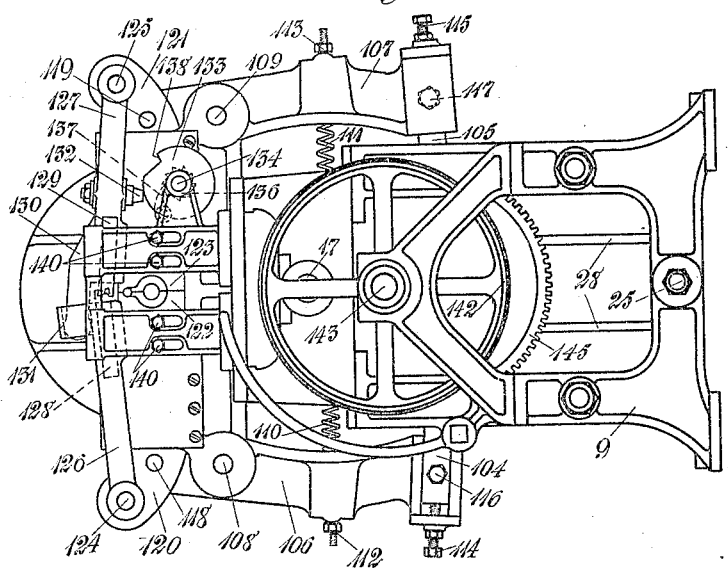

Fig. 10. is a plan view of the feeding device for the wire.

Fig. 11 is a longitudinal vertical sectional view thereof taken on line C—C of Fig. 10.

Fig. 12 is a plan view of the same device with some parts removed.

Fig. 13 is a horizontal section of the feeding device taken on line D—D of Fig. 10.

Fig. 14 is a side view of one half of a bending implement.

Fig. 15 is a horizontal section of the bending implement taken on line H—H in Figs. 16 and 17.

Fig. 16 is a transverse vertical section taken on line E—E in Fig. 14 of the bending implement.

Fig. 17 is a similar section taken on line F—F in Fig. 14.

Fig. 18 is a vertical section of another coupling device.

Fig. 19 is a plan view thereof.

Fig. 20 a plan view of a detail of the same coupling device on a decreased scale.

Fig. 21 is a section on the line G—G in Fig. 20 on an increased scale.

Figs. 22, 23, 24 and 25 show details of the wire bending and cutting mechanism.

The wire 1 is wound on a reel 2, which is rotatably mounted on a pin 4 carried by bearing arms 3. The bearing arms 3 are slidably connected to arms 6 projecting from a casing 5 and each arm 3 is provided with a slot 7, through which passes a bolt 8 carried by an arm 6, by which means the bearings 3 can be adjusted and secured in a desired position relative to the arms 6. The casing 5 is rotatably mounted in bearings 10 and 11 carried by the framework 9 and is provided with a toothed wheel 12 actuated from gear-wheels 13, 14, 15, 16 and 18 by means of a shaft 17 in the framework 9. The wire 1 passes from the reel 2 through a straightening apparatus of some suitable design, which consists of a tubular casing 20, rotatably mounted in the casing 5 on ball bearings 19. The casing 20 is provided with a plurality of blocks 21 having holes through which the wire 1 is drawn during the rotation of the casing 20. The casing is rotated by means of a belt-pulley 22 driven by a belt 23 from a pulley 24, mounted on the shaft 17. In the lower part of the framework 9 is a horizontal rod 25 provided intermediate its ends with screw-threads 26, which engage a nut 27, provided with two diametrically opposite projecting pins 171, embraced by the lower ends of two vertical members 28, which are joined by means of cross-stays 29, 30 and 31. The stay 31 is connected to the bearing 11 by means of a spiral spring 32, which tends to move the upper ends of the members 28 toward the casing 20. On the stay 29 there is pivotally mounted a bow 33 carrying a roller 34, which by means of the spring 32 is held against a cam disk 35 rigidly mounted on a rotatable shaft 36. Between the upper parts of the members 28 there is arranged a feeding device 37, which is shown in detail in Figs. 10–13. This feeding device comprises an outer casing 38 secured by screws 39 to the members 28, and a corresponding ring 40 secured by screws 41 to the casing 38. The parts 38 and 40 are provided with a cup-shaped socket in which is mounted a ball 42. The ball 42 is provided with an open radial slot 43, wide enough to constitute a passage for the wire 1. The parts 38 and 40 are provided with slots 44 and 45 respectively, of the same width as the slot 43. In the ball 42 there are slidably mounted two dies 46 movable toward and away from each other and each die is provided with a conical hole 47 in which the conical end of a set screw 48 is inserted for limiting the movement of the dies in a radial direction away from the wire 1. By turning the screws 48, the dies 46 may be moved toward and away from the axis of the ball 42, so that the mutual distance of the dies will suit the thickness of the wire 1. Each of the dies is provided with arms 49 between which are mounted, on a pivot 51, the lever 50. The outer end of each lever 50 is forced forward by a spiral spring 52, which has its ends mounted in recesses in the lever and die. The rearward movement of the inner ends of the levers 50 is limited by pins 53 carried by the arms 49.

By moving the feeder 37 along the wire to the right the curved inner ends of the levers 50 will slide along the wire. By moving the feeder 37 to the left the inner ends of the levers 50 will lock on the wire and thus squeeze the wire 1 between them so that the wire 1 will be fed forward with the feeder 37. Thus the device operates like a ratchet clutch. In front of the socket of the feeder 37 is arranged a cover 54 to which there is attached a closure 55 provided with a hole for the wire 1. This plate 55 serves to guide the wire 1 during its feeding motion. Owing to the ball 42 being mounted for universal movement in the socket 38, it automatically adjusts itself with regard to the longitudinal direction of the wire 1, as best shown in Fig. 1. When the shaft 36 and cam disk 35 revolve, the members 28 and the feeder 37 obtain the reciprocal motion necessary for the step by step feeding of the wire 1.

In front of the casing 20 and forward of the feeder 37 there is provided a device for bending the wire 1 into loops. This device consists of a casing 56, screwed into another casing 57, which is screwed into the hub of a toothed wheel 58, secured by means of screws 59 to a ring 60 having a conical inner surface against which bears the conical outer face of a ring 61. The toothed wheel 58 is inclosed by a casing 62, provided on its interior with a collar 63, which coöperates with a corresponding groove in the ring 61 and serves as a guide for the latter. Exterior of the casing 57 there is screwed a ring 64 which secures the toothed wheel 58 on the casing 57. The casing 57 is provided with a bending block 65 having an eccentrically positioned hole 135. In the center of the block 65 a mandrel 66 projects in an axial direction. The toothed wheel 58 meshes with a gear 67 which is connected to a coupling device which is described below in connection with Figs. 18–21. The wheel 67 is secured to the hub 172 of a coupling wheel 68 that is mounted for rotatable and slidable movement on the shaft 17, which coupling wheel 68 is provided with four radial recesses 69 positioned at an angle of 90° relative to one another. Located in each of the recesses 69 is a dog 70, pivoted upon a pin 71. The inner end of each dog 70 is engaged by a spiral spring 72. The springs 72 press upon the inner ends of the dogs 70 and tend to swing with their outer ends toward the wheel 68. This movement is limited by stops 73 on the wheel 68, coöperating with projections 74 on the dogs 70. The shaft 17 is provided with a ratchet disk 75 secured thereto by a pin 76 and surrounded by a ring 146, fixed on the shaft 17. On the side facing the dogs 70 the ratchet disk 75 is provided with four radially arranged ridges 77 at an angle of 90° to one another. These ridges are shown in cross section in Fig. 21, and the side facing the dog 70 in the moving direction of the wheel 75 slopes down rather abruptly while the rear side thereof slopes more gradual. According to Fig. 18, the wheel 68 with the dogs 70 is in gear, i. e. forced against the disk 75, so that the outer ends of the dogs 70 on account of the pressure exerted by the disk 75 on their inner ends, against the force of the springs 72, are swung downward into gear with the ridges 77. When the wheel 68 is moved away from the disk 75, the outer ends of the dogs 70 are moved by the springs 72 against the stops 73. The heels 170 on the inner ends of the members 70 rest on the hub of the disk 75, until the projections 74 engage the stops 73.

The sliding movement of the wheel 68 on the shaft 17, toward and from the ratchet disk 75, is effected by means of an oscillating device, best shown in Figs. 7, 8 and 9. On the shaft 36 there is a freely mounted ring 78 provided with pins 79 on which is pivoted an oscillating arm 80, embracing the shaft 36 and on its upper end provided with two arms 81 having blocks 82 coöperating with a groove 83 on the hub of the wheel 68, and serving as a means for sliding the wheel 68. On opposite sides of the shaft 36 and mounted on axles 86 are friction rolls 84, 85 carried by the oscillating arm 80. Each of these rolls has a large and small periphery and each roll is mounted on a sliding block 88 secured to the arm 80 by means of a bolt 87. The large peripheries of the rolls are spaced different distances from the axis of the shaft 36, and these rolls engage a cam disk 89, which is secured to a toothed wheel 90 fixed on the shaft 36. The disk 89 is provided with four separate concentrically arranged and rather thin cams 91, 92, 93 and 94 annularly curved and each extending substantially half a circle, the two outer of which cams 91 and 92 are spaced equal distances from the axis of the shaft 36 and are engaged by the roll 84. The two inner cams 93 and 94 are spaced equal distances from the axis of the shaft 36 and are engaged by the roll 85. The cams 91 and 93 are both on an equal level (the high level in Fig. 8) and the cams 92 and 94 are both on an equal level (the low level in Fig. 8), which last mentioned level is parallel to the first mentioned level. The high level cam 91 has peripherally a larger extent than the low level cam 92 and is by means of a perpendicular step 95 set down to the low level cam 92, which by means of an inclined plane 96, again merges into the high level cam 91. The high level cam 93 has some less extent than the low level cam 94 and is by means of a perpendicular step 97 set down to the low level cam 94, which by means of an inclined plane 98 merges into the high level cam 93. The said cam levels are so arranged in relation to one another that the step 95 and the plane 98 are located diametrically opposite to each other, and the step 97 and the plane 96 are also located diametrically opposite each other. In the position of the disk 89, as shown in Fig. 7, the roll 84 is on the high level cam 93 and the roll 85 on the low level cam 92, which in Fig. 8 is indicated by dotted lines. In this position of the cams, the arm 80 has its lower end swung toward the disk 89 (Fig. 7). When the disk 89 is revolved to the right in Fig. 8, the inclined plane 96 after a quarter of a turn reaches the roll 85 and this causes the roll 85 to move over the plane 96 from the low level cam 92 to the high level cam 91. At the same time the perpendicular step 97 has reached the roll 84, and this roll suddenly moves from the high level cam 93 down to the low level cam 94. By this movement, the lower end of the arm 80 swings outward off the disk 89 and the upper end of the arm moves the wheel 68 away from the ratchet disk 75 and thus unclutches the gear 67 from the shaft 17. When the inclined plane 98 after a little more than half a turn in the same direction as before reaches the roll 84, the latter rolls from the low level cam 94 to the high level cam 93, and at the same time the step 95 has reached the roll 85, and this roll moves from the high level cam 91 down to the low level cam 92. This causes the lower end of the arm 80 to swing inward toward the disk 89 into the position shown in Fig. 7 and pushes the wheel 68 toward the ratchet disk 75, thus putting this in gear. The continued revolving of the disk 89 in Fig. 8, not quite half a turn, will cause the inclined plane 98 to reach the roll 85 once more, and the step 97 to reach the roll 84, by means of which the arm 80 once more attains such a position that the ratchet disk 75 becomes disconnected from the wheel 68. From the above it may be understood that the cams 91—94 are of proper height and length to maintain the ratchet disk 75 in gear during less than half a turn and disconnected a little more than half a turn of the disk 89. The described coupling device combines the yielding features of a friction clutch with the exact working of a claw coupling. A friction clutch is not to be recommended in this connection on account of the slip which cannot be fully avoided in the coupling moment, and a claw-coupling operates too abruptly.

Figure 4:
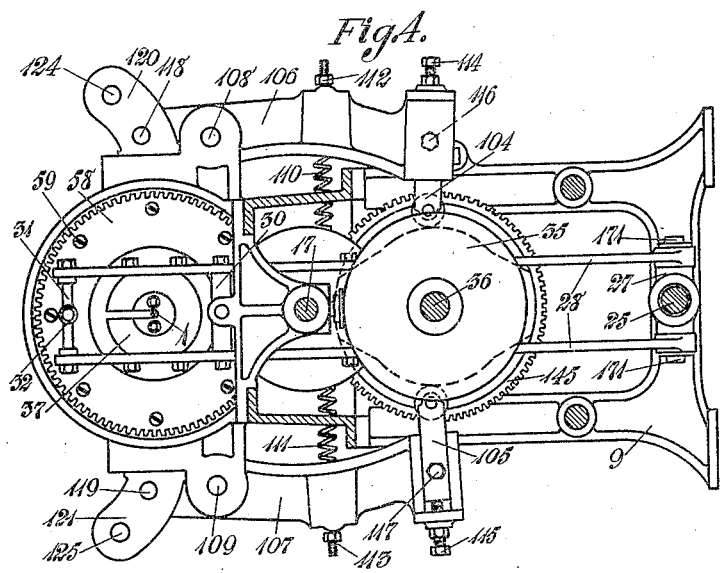
Fig. 4 is a transverse vertical section on the line A—A of Fig. 1 and looking to the left.
Figure 5:
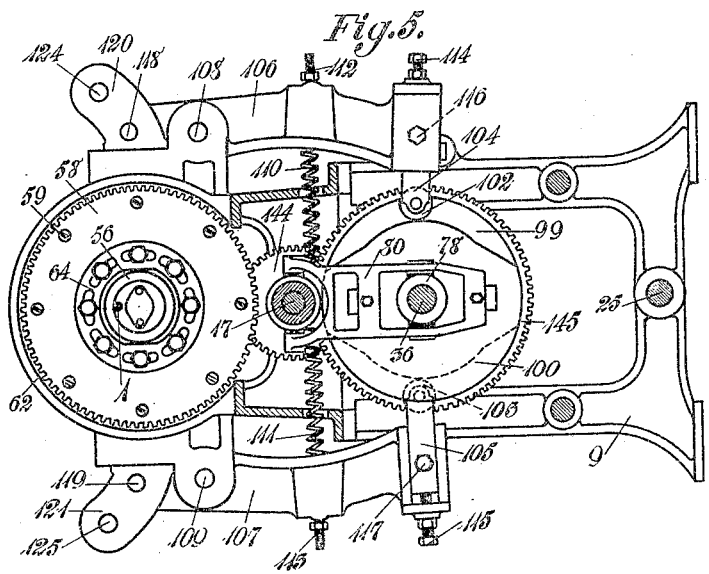
Fig. 5 is a similar section on the line B—B of Fig. 1.
Figure 6:
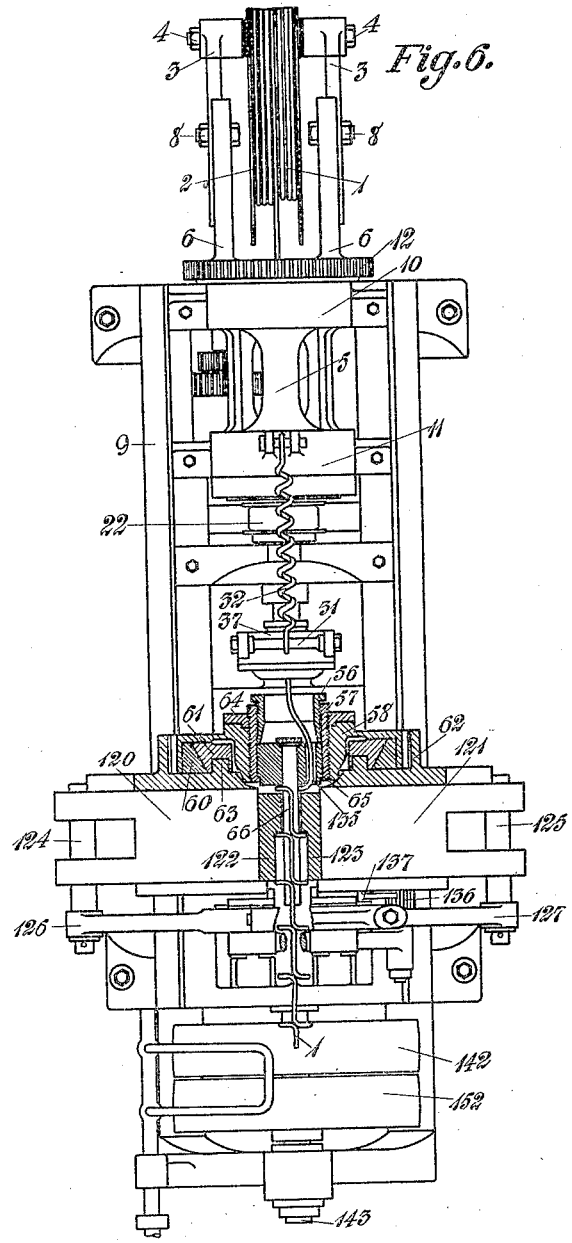
Fig. 6 is a plan view of the machine with various parts shown in horizontal section.

The toothed wheel 90 is provided with a flange 101 on which are mounted two oppositely disposed cam disks 99 and 100. The flange 101 projects from the toothed wheel 90 and incloses the hub of said wheel. Upon the cam disks 99 and 100 there rest anti-friction rolls 102 and 103 (Figs. 4 and 5), which are rotatably mounted in slides 104 and 105 carried by the lower arms of two-armed levers 106 and 107. These levers are pivoted on pins 108 and 109 on the framework 9, and the lower arms of the levers are drawn toward the cams 99 and 100 by springs 110 and 111, which are attached to the framework 9 and tend to keep the rolls 102 and 103 in contact with the cam disks 99 and 100. The tension of the springs 110 and 111 can be adjusted by means of screws and nuts 112 and 113 respectively. The slides 104 and 105 can be adjusted by means of screws 114 and 115 and they can be locked by means of stop-screws 116 and 117. The upper arms of the levers 106 and 107 are pivotally connected by pins 118 and 119 to plungers 120 and 121 which are mounted for reciprocating movement in suitable guides in the framework 9. (See Figs. 3, 4, 5, 22, 23, 24 and 25.) At the inner end of the plungers 120 and 121 there are dies 122 and 123, best shown in Figs. 14–17, which face one another and are provided with cavities or grooves of suitable shape so as to produce together an inclosure for the wire 1 during the bending thereof as hereinafter described. Between the dies 122 and 123 and the bending block 65 there is provided a space 153, of a width only slightly larger than the diameter of the wire 1. The plungers 120 and 121 are pivotally connected by pins 124 and 125 (Figs. 3, 4, 5, 22, 23, 24, 25) to the outer ends of arms 126 and 127, which are provided at their inner ends with cutters 128 and 129. From the top of the arm 127 there projects a finger 130 having a curved shaped end which engages a socket 131 mounted on the top of the arm 126. By this connection the arm 127 actuates the arm 126. The arm 127 is provided on its under side with a projecting adjustable pin 132 supported by a cam disk 133 on a shaft 134, journaled in the framework 9. This shaft 134 is provided with a ratchet wheel 136 (Figs. 3, 6, 22, 23, 24, 25) engaged by a pawl 137, pivoted on one side of the plunger 121. The cam disk 133 is provided with a notch 138, into which the pin 132 falls, when the disk 133 revolves and permits the arm 127 to descend. As the arm 127 is connected by means of the coupling device 130 and 131 to the arm 126, said arm 126 will also be moved downward (see Fig. 24). In this position the arms 126 and 127 are supported by two angle-shaped prongs 141 adjustably attached to the inner side of a support 139 by means of screw bolts 140 (see Figs. 1 and 25).

The motive power for the machine is transmitted by means of a fixed belt pulley 142 at the side of which there is a freely mounted belt pulley 152, both pulleys being arranged on a shaft 143 from which the power is distributed by means of gear-wheels 144 to the shaft 17, and from shaft 17 by means of gear-wheels 145—90 to the shaft 36.

The machine operates as follows:

When starting, the wire 1 is threaded by hand through the tube casing 20, the feeder 37, the hole 135 in the bending block 65, and into the cavity 147 formed between the grooved faces of the dies 122 and 123. On moving the machine from the position shown in Fig. 1, in which the gear wheel 67 is connected with the shaft 17, the bending block 65 is caused to revolve or turn. By this movement a loop 148 (Fig. 14) is formed in the space 153 between the dies 122 and 123 and the bending block 65 and this loop is wound about the mandrel 66 (Fig. 14). The loop 148, on account of the narrow width of the space 153, is forced to assume a plane, perpendicular to the mandrel 66 and thereby perpendicular also to the longitudinal direction of the main portion of the wire 1. At the beginning of this stage of the operation, the feeder 37 is in the position shown by full lines in Fig. 1, and at the end of the same stage the feeder has been brought rearward into the position shown by dot and dash lines in the same figure. When the bending block 65 has been revolved one turn, the gear wheel 67 is uncoupled from the shaft 17 in the manner heretofore described, so that the wheel 67 as well as the other parts of the bending device now remain stationary. Now the dies 122 and 123 separate by the influence of the spiral springs 110 and 111, drawing the lower arms of the levers 106 and 107, and the feeder 37 feeds the wire toward the left according to Fig. 1, squeezing the wire 1 in the manner described, so that the wire is fed forward along the mandrel 66 a distance equal in length to, or a little more than, the length of the portion 151 of the dies (Fig. 14). The completed loop, marked with the reference figure 149, now stands on the left of the portion 151, and the feeder 37 once more has reached the full lined position in Fig. 1. The dies 122 and 123 are then brought together and close around the loop 149, squeezing the corner-portions 155 thereof (Fig. 16), and the bending block 65 again is rotated one turn, so that a further loop 148 is produced in the space 153. The stretching force set up in the wire portion 150 which connects the loops 148 and 149, by the influence of the squeezing of the corners, causes the said portion 150 to be forced down into suitably rounded grooves above the heel-shaped die portion 151. After this operation the dies 122 and 123 are moved apart and the wire 1 is again moved forward one step, so that the loop 149 takes the position of the loop 157 in Fig. 14 and the loop 148 the position of the loop 149. The curved portion 150 now takes the position of the curved portion 154 in the channel 156, formed by the meeting faces of the dies 122 and 123 when closed. In this manner the wire is moved forward step by step and one loop is completed by each movement.

Each time the dies 122 and 123 move away from each other, the pawl 137 will move the ratchet wheel 136 one step, and as said ratchet wheel is rigid with the cam 133, it will be seen that the movement of the die 121 will cause the rotation of the cam 133. By this means, after the cam has moved the proper distance, the pin 132 will engage the notch 138 and allow the cutter arms 126 and 127 to descend, whereby after one full turn of the disk 133 to the right according to Fig. 3, the finger 132 is caused to fall into the notch 138, and the cutters in passing one another will shear the wire 1. As the plungers 120 and 121 continue to reciprocate the disk 133 will be revolved by the action of the pawl 137 on the wheel 136, and the arms 126 and 127 will be again raised into the position shown in Fig. 3.

The described embodiment of the machine may be varied in one or another detail without departing from the spirit of the invention. For instance, the wire straightening device may be of any other suitable design, as may also the device for cutting the wire. Said parts also may be fully dispensed with and replaced by separate tools or apparatus without combination with the machine proper. The coupling and feeding devices described also may be of any other design, provided that they admit the machine to operate in accordance with the chief requirement mentioned above.

Having now described and ascertained the nature of the said invention what is claimed as new is:

1. A method of providing a wire with loops which extend laterally at substantially right angles on one side of an unbent portion of the wire arranged between each pair of consecutive loops, consisting in securing an unbent portion of the wire which, is to be located between two loops, adjacent to and at one side of a mandrel, and rotating the unsecured portion of the wire entirely around the mandrel in a confined space to form a single loop, the confining of the wire during rotation preventing the same from moving out of a plane perpendicular to the axis of the mandrel.

2. A method of providing a straight wire with loops extending at right angles to the straight wire, which consists in securing the wire at one side of a mandrel which extends substantially parallel to the straight wire, rotating said wire around the mandrel to form a complete loop, and then compressing the loop and the wire adjacent it.

3. A method of providing a straight wire with loops extending at right angles to the straight wire, which consists in intermittently feeding the wire forward, securing the wire at one side of a mandrel between each feeding movement, winding said wire around the mandrel to form a loop, and compressing said loop and the wire adjacent the same.

4. A machine for providing a wire with spaced loops which extend laterally at one side and at substantially right angles to straight portions of the wire comprising a mandrel, means for clamping an unbent portion of the wire at one side of the axis of the mandrel, means for turning the wire around the mandrel and a chamber located between the clamping means and the turning, said chamber having parallel walls extending at right angles to the axis of the mandrel adapted to engage the portion of the wire which forms a loop.

5. A machine for forming looped wire, including a mandrel, a chamber arranged around said mandrel, means for securing wire at one side of said mandrel, and means for feeding an unsecured portion of the wire into said chamber and means for wrapping the same around said mandrel to form a loop.

6. In a machine for forming looped wire, a stationary mandrel, means for clamping wire at one side of said mandrel, a rotatable bending block having its axis arranged in alinement with said mandrel and provided between its axis and periphery with an aperture extending parallel to the block axis, and a chamber arranged between the clamping means and block, said chamber having parallel walls arranged perpendicular relative to the mandrel for engaging the wire after its passage through the block.

7. A machine as defined in claim 8, provided with dies movable toward and away from said wire, said dies having grooved faces to receive the wire and being adapted to compress the same.

8. A machine as defined in claim 9, in which the dies are spaced away from the bending block a distance substantially equal to the thickness of the wire.

9. In a machine of the class described, a plurality of dies movable toward and away from a looped wire and provided with means for engaging and compressing the wire, a plurality of pivoted arms carrying cutters, means connecting the arms for joint movement, a rotatable cam provided with a notch, a ratchet wheel rigid with said cam, a pawl carried by one of the dies and engaging said ratchet wheel during movement of the dies for intermittently rotating said cam, and a member carried by one of the arms and engaging said cam.

In testimony whereof I have affixed my signature in presence of two witnesses.

CARL GUSTAF SÖDERLUND.

Witnesses:
 GUSTAF SEITZ,
 RALF ERIKSON.